US009454464B2

(12) United States Patent
Fernandez et al.

(10) Patent No.: US 9,454,464 B2
(45) Date of Patent: Sep. 27, 2016

(54) APPLICATION DEVELOPMENT CENTER TESTING SYSTEM

(75) Inventors: Antonio L. Fernandez, Pompano Beach, FL (US); Jeffrey H. Platter, Coral Springs, FL (US); Louis E. Miller, Little Egg Harbor Township, NJ (US)

(73) Assignee: CBS Interactive Inc., New York, NY (US)

( * ) Notice: Subject to any disclaimer, the term of this patent is extended or adjusted under 35 U.S.C. 154(b) by 489 days.

(21) Appl. No.: 13/569,902

(22) Filed: Aug. 8, 2012

(65) Prior Publication Data

US 2014/0045597 A1 Feb. 13, 2014

(51) Int. Cl.
G06F 9/44 (2006.01)
G06F 11/36 (2006.01)

(52) U.S. Cl.
CPC .............. G06F 11/3672 (2013.01); G06F 8/20 (2013.01)

(58) Field of Classification Search
CPC .................................................. G06F 11/3672
See application file for complete search history.

(56) References Cited

U.S. PATENT DOCUMENTS

| | | | | |
|---|---|---|---|---|
| 8,862,950 B1 * | 10/2014 | Ginsberg et al. | ................ | 714/57 |
| 2003/0236855 A1 * | 12/2003 | Quesnel, Jr. | .................. | 709/217 |
| 2004/0030747 A1 * | 2/2004 | Oppermann | ........ | G06F 11/3414 709/203 |
| 2004/0107415 A1 * | 6/2004 | Melamed | ............ | G06F 11/3684 717/124 |
| 2004/0117460 A1 * | 6/2004 | Walsh | .................... | H04L 41/145 709/219 |
| 2005/0166094 A1 * | 7/2005 | Blackwell et al. | ............. | 714/38 |
| 2006/0294434 A1 * | 12/2006 | Ikeda et al. | ...................... | 714/38 |
| 2009/0259714 A1 * | 10/2009 | Doerksen et al. | ............ | 709/203 |
| 2010/0050229 A1 * | 2/2010 | Overby, Jr. | ............. | H04L 63/20 726/1 |
| 2011/0258049 A1 * | 10/2011 | Ramer et al. | ............... | 705/14.66 |
| 2012/0179277 A1 * | 7/2012 | Lymberopoulos | .............. | 700/91 |
| 2013/0167162 A1 * | 6/2013 | Fernandez | ..................... | 719/328 |
| 2013/0176401 A1 * | 7/2013 | Monari et al. | ................... | 348/47 |
| 2013/0191814 A1 * | 7/2013 | Fujii et al. | ..................... | 717/124 |
| 2013/0275656 A1 * | 10/2013 | Talagala et al. | ............... | 711/103 |
| 2014/0047417 A1 * | 2/2014 | Kaasila | ............... | G06F 11/3664 717/135 |
| 2014/0172871 A1 * | 6/2014 | Brayman | ............ | G06F 11/3664 707/741 |
| 2014/0342811 A1 * | 11/2014 | Shore et al. | ..................... | 463/25 |
| 2015/0067648 A1 * | 3/2015 | Sivanesan | ........... | G06F 11/3684 717/124 |
| 2015/0142878 A1 * | 5/2015 | Hebert et al. | .................. | 709/203 |
| 2015/0339213 A1 * | 11/2015 | Lee | ...................... | G06F 11/3664 717/125 |

\* cited by examiner

Primary Examiner — Chameli Das

(57) ABSTRACT

An application development center system is described. A method may comprise receiving an application at a server computing device; accessing test data from one or more data sources; testing the application within a development environment resident on the server computing device utilizing the test data; and presenting test results on a user interface accessible by a client computing device. Other embodiments are described and claimed.

24 Claims, 8 Drawing Sheets

500

```
┌─────────────────────────────────────┐
│  RECEIVE AN APPLICATION AT A SERVER │
│         COMPUTING DEVICE            │
│                 502                 │
└─────────────────────────────────────┘
                  │
┌─────────────────────────────────────┐
│  ACCESS TEST DATA FROM ONE OR MORE  │
│              DATA SOURCES           │
│                 504                 │
└─────────────────────────────────────┘
                  │
┌─────────────────────────────────────┐
│ TEST THE APPLICATION WITHIN A       │
│ DEVELOPMENT ENVIRONMENT RESIDENT ON │
│ THE SERVER COMPUTING DEVICE         │
│ UTILIZING THE TEST DATA             │
│                 506                 │
└─────────────────────────────────────┘
                  │
┌─────────────────────────────────────┐
│ PRESENT TEST RESULTS ON A USER      │
│ INTERFACE ACCESSIBLE BY A CLIENT    │
│ COMPUTING DEVICE                    │
│                 508                 │
└─────────────────────────────────────┘
```

*FIG. 5*

APPLICATION DEVELOPMENT CENTER TESTING SYSTEM

BACKGROUND

Testing is a crucial phase in the software development life cycle. The software application marketplace is full of products that were not successful due to post-launch defects or "bugs." Once a product has gained a reputation as having bugs, especially bugs involving security, data preservation, or core functionality, it is difficult, if not impossible, to reverse consumer perceptions. As such, it is important to test and validate an application in as realistic conditions as possible. For example, application testing utilizing realistic data and user input. However, it is difficult for a developer who is not associated with a large business entity to have access to development environments and data that may provide rigorous development testing, especially data tailored specifically for their particular type of application. Therefore, one design goal for content providers is to develop application development and testing platforms capable of testing user applications utilizing realistic data and testing events. As such, techniques designed to validate applications in a dynamic, realistic development environment are desirable.

BRIEF DESCRIPTION OF THE DRAWINGS

FIG. 5 illustrates a first logic flow in accordance with one or more embodiments.

DETAILED DESCRIPTION

Figure 1:
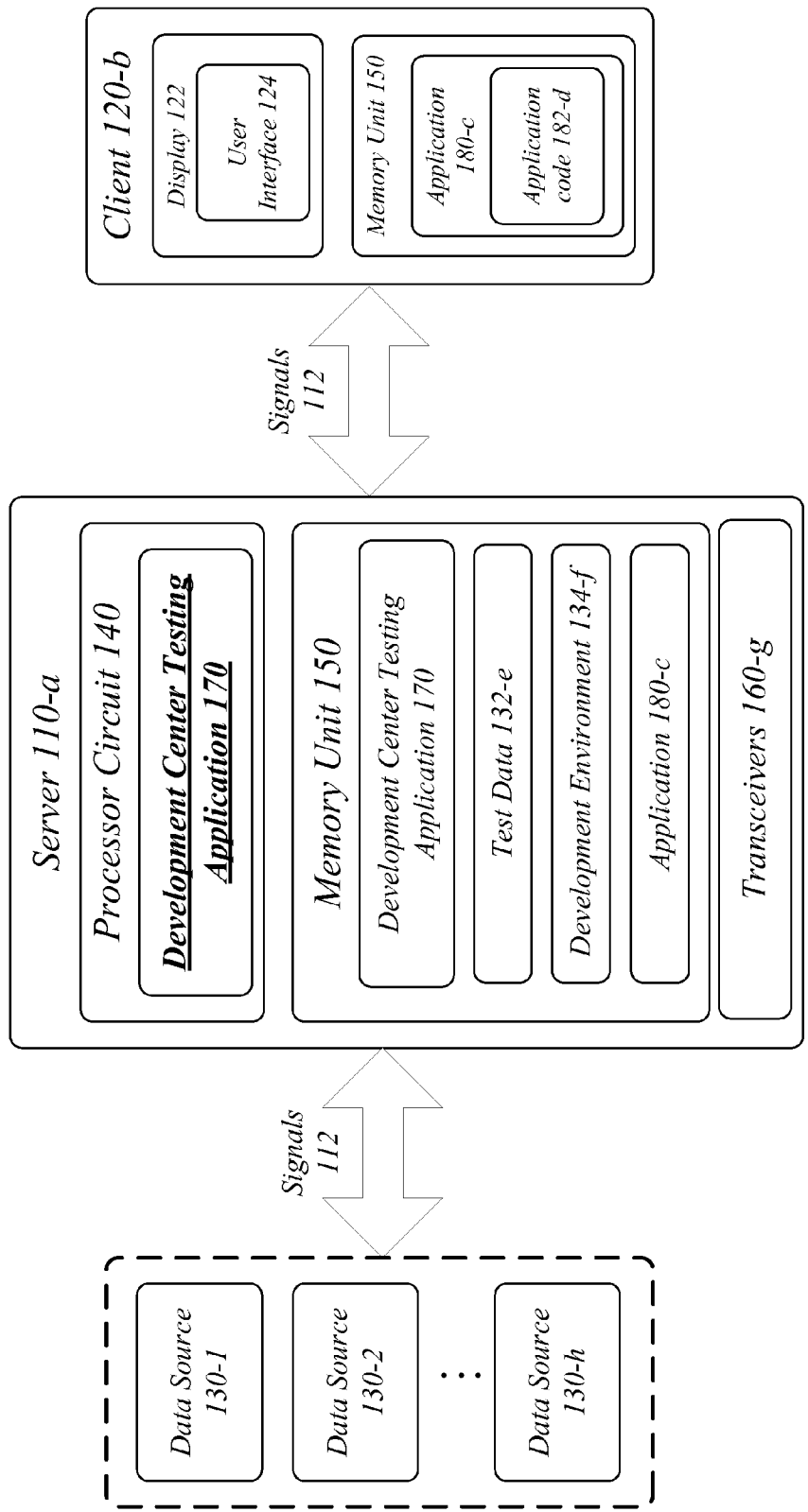
FIG. 1 illustrates an embodiment of an application development center system.

Embodiments are generally directed to fantasy games. A fantasy game is one where participants act as an owner to build a team that competes against other fantasy owners based on statistics generated by real individual players of a game. Fantasy sport is a class of fantasy games. For instance, a fantasy owner might draft a fantasy football team to compete with other fantasy football teams based on statistics generated by real football players from the National Football League (NFL). A common variant uses a computer model to convert statistical performance into points that are compiled and totaled according to a roster selected by a manager of a fantasy team. As with a real team, a fantasy owner is given various online tools to sign, trade and cut fantasy players just like a real team owner.

In general, a game is a system in which players engage in an artificial conflict, defined by rules and a scoring system, resulting in a quantifiable outcome. A fantasy game is a game based on a quantifiable outcome of another game. More particularly, a fantasy game uses a scoring system that is based, at least in part, on a quantifiable outcome of another game in order to obtain a quantifiable outcome for the fantasy game. For instance, a fantasy sport game may comprise a fantasy team selected from human players of a real sport. The fantasy sport game may convert statistical information of human player performance in real sporting competitions (e.g., a football game, a baseball game, etc.) into points that are compiled and totaled according to a roster of a fantasy team. Fantasy players of the fantasy sport game then compete based on the totaled points.

Fantasy games may be based on any type or genre of games. Some examples of games may include without limitation sports, board games, video games, games of chance, lawn games, tabletop games, party games, dexterity games, coordination games, card games, dice games, domino and tile games, guessing games, video games, electronic games, electronic video games, online games, role-playing games, business games, simulation games, television games, reality television games, artificial reality games, and so forth. A fantasy game may be based on any of these or other types of games. A particularly large segment of fantasy games focus on sports, such as football, basketball, baseball, soccer, hockey, racing, and so forth. Recently, emerging fantasy game genres have branched out to include non-sports related games focused on politics, celebrity gossip, movies, and reality television. For instance, fantasy congress is a fantasy game where players, called citizens, could draft members of the United States House and Senate, and keep track of their participation within the U.S. Congress. Actions, especially within the process of making and amending pieces of legislation, of a player's drafted congresspersons are recorded and rated as a cumulative total amount of points against other players. The embodiments are not limited in this context.

Fantasy games may have many fantasy game genres. For example, fantasy sport is a class of fantasy games. A fantasy owner might draft a fantasy football team to compete with other fantasy football teams based on statistics generated by real football players from the National Football League (NFL). Fantasy reality TV is another class of fantasy games. For instance, a fantasy owner might draft a fantasy reality team to compete with other fantasy reality teams based on statistics generated by reality show contestants, such as contestants for such reality shows as Big Brother, Survivor, American Idol, Dancing With The Stars, The Apprentice, Fear Factor, The Amazing Race, and so forth. Fantasy board is another class of fantasy games. For instance, a fantasy owner might draft a fantasy board game team to compete with other fantasy board game teams based on statistics generated by board game contestants, such as chess players, poker players, checker players, monopoly players, or other board games. Fantasy electronic is another class of fantasy games. For instance, a fantasy owner might draft a fantasy electronic game team to compete with other fantasy electronic game teams based on statistics generated by electronic game contestants, such as electronic video game players, electronic gambling game players, and other electronic games. The embodiments are not limited in this context.

Advances in computing device technology and programming languages have resulted in a great increase in the number of individuals developing applications, especially individuals not associated with a large software entity. For example, the number of developers creating applications for mobile devices (e.g., "apps" or "mobile apps") has vastly expanded. Another area popular with developers involves fantasy games. No longer are participants and fans content with the offerings provided by content providers, such as CBS Sports®, CBS Interactive, Inc., and the Entertainment and Sports Programming Network (ESPN®). Developers are now interested in developing their own fantasy sports applications, such as applications involving league configurations and rules, player drafts, season implementation and management, and statistics. However, these developers are often not able to develop and test their applications in an environment conducive to being accessed and utilized by potential users. For instance, a fantasy sports application may benefit from being tested utilizing realistic data for a specific sport and a league for the specific sport, such as the National Football League (NFL®) for football or Major League Baseball® (MLB®) for baseball. In addition, it may be desirable for a fantasy sports application to be developed in an environment where potential fantasy sports participants may actually access and utilize the application, such as a fantasy sports application or website. It is with respect to these and other considerations that the present improvements have been needed to increase content consumption, build product loyalty, increase online advertising revenue, and attract new content consumers.

Various embodiments are directed to techniques for developing and testing applications through an application development center operating on a computing device, such as a server. In one embodiment, a client computing device may establish a connection with the application development center and initiate application development or upload a fully or partially developed application. The application development center may provide a development environment for the application and may have access to one or more data sources for testing the application. In this manner, a user may develop and test an application on another computing device without having to replicate a testing or development environment, such as a sandbox, on their own machine. According to embodiments, the application development center may be associated with the environment where the application may be hosted and accessed by users. In one embodiment, the application development center may comprise a set of websites and development tools for creating applications to operate on a particular website. For example, a fantasy sports application may be developed to operate on a "Fantasy Sports Website," while the application development center may be a set of web pages accessible from the Fantasy Sports Website, such as a set of application developer pages. In this manner, a developer seeking to develop an application accessible from the Fantasy Sports Website may be confident that the application will function correctly because, inter alia, the application may be developed and tested through the Fantasy Sports Website developer pages.

The application development center may additionally provide applications developed therein with access to realistic data for thorough testing of an application. For example, a football fantasy sports application may be tested using realistic data in life-like conditions. Each season for a particular sport progresses through a series of states. Non-limiting examples of these states include pre-season, early season, mid-season, end of season, and playoffs. These states may each have their own unique set of data and data characteristics. In one embodiment, an application may be tested using realistic data as well as realistic data for a particular condition. For instance, a fantasy football application may be tested utilizing NFL® statistics, or other actual or generated realistic statistics, in one or more particular states. In this manner, a developer may test an application directed toward a particular sport as the season progresses for the sport.

With general reference to notations and nomenclature used herein, the detailed description which follows may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Various embodiments also relate to apparatus or systems for performing these operations. These apparatus may be specially constructed for the required purpose or may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for an application development center system 100. In one embodiment, the application development center system 100 may comprise a computer-based system comprising a server 110-*a*, such as an application development server. The application development server 110-*a* may comprise, for example, a processor circuit 140, a memory unit 150, and one or more transceivers 160-*g*. The server 110-*a* may further comprise a development center testing application 170. The memory unit 150 may store an unexecuted version of the development center testing application 170, test data 132-*e*, or a development environment 134-*f*. Although the application development center system 100 shown in FIG. 1 has a limited number of elements in a certain topology, it may be appreciated that the application development center system 100 may include more or less elements in alternate topologies as desired for a given implementation.

It is worthy to note that "a," "b," "c" and similar designators as used herein are intended to be variables representing any positive integer. Thus, for example, if an implementation sets a value for a=5, then a complete set of servers 110-*a* may include servers 110-1, 110-2, 110-3, 110-4, and 110-5. The embodiments are not limited in this context.

In various embodiments, the application development center system 100 may comprise multiple computing devices, such as servers 110-*a* and clients 120-*b*. Some examples of a computing device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, machine, or combination thereof. The embodiments are not limited in this context.

In one embodiment, for example, the servers 110-*a* may be implemented as a web server or a network server, accessible over a network, such as the Internet. The client 120-*b* may be implemented as a desktop computer or a mobile device having a portable power supply and wireless communications capabilities, such as a laptop computer, handheld computer, tablet computer, smart phone, gaming device, consumer electronic, or other mobile device. The embodiments are not limited to these examples, however, and any servers 110-*a* and clients 120-*b* may be used as desired for a given implementation. The servers 110-*a* may communicate with other computing devices 120-*b* using communications signals 112 via the transceivers 160-*g*. The embodiments are not limited in this context.

In various embodiments, the application development center system 100 may comprise a processor circuit 140. The processor circuit 140 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core (2) Quad®, Core i3®, Core i5®, Core i7®, Atom®, Itanium®, Pentium®, Xeon®, and XScale® processors; and similar processors. Dual microprocessors, multi-core processors, and other multi-processor architectures may also be employed as the processor circuit 140.

In various embodiments, the application development center system 100 may comprise a memory unit 150. The memory unit 150 may store, among other types of information, the development center testing application 170. The memory unit 150 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Data sources 130-*h* may comprise any defined set of electronic information, data, or content capable of being a source of data for an application, such as the development center testing application 170 or application 180-*c*. One exemplary class of data accessible through a data source 130-*h* may include, without limitation, software computer files, including application files (e.g., document files, word processing files, spreadsheet files, presentation files, etc.), system files (e.g., operating system files, library files, utility files, etc.), and multimedia content files (e.g., audio files, video files, audio/video files, picture files, image files, etc.). Other examples of data sources 130-*h* may include multimedia content (e.g., pictures, images, video, audio, graphics, games, discussion forums, blogs, contests, etc.), software programs, views of software programs, application documents, application content (e.g., a paragraph from a word processing document or work sheet from a spreadsheet document), a web page, a web site, a uniform resource locator (URL) from a web browser, clipboard data, screenshots, device resource data (e.g., sensor data), and so forth. These are merely a few examples, and any type of defined set of electronic information, data, or content may comprise a data source 130-*h* as utilized in the application development center system 100. As illustrated in FIG. 1, the data sources 130-*h* may be accessible by the servers 110-*a* through signals 112 received through the transceivers 160-*g*. The test data 132-*e* may comprise data drawn from the various data sources 130-*h*, such as a subset of the data from one or more data sources 130-*h*. According to embodiments, the test data 132-*e* may comprise data utilized during actual application 180-*c* testing so that the server 110-*a* does not have to continually go out and obtain data from the data sources 130-*h*. The embodiments are not limited in this context.

Users may access the development center testing application 170 or development environment 134-*f* through a user interface 124 accessible by a display 122 of a client 120-*b*. The display 122 may comprise any digital display device suitable for the one or more clients 120-*b*. For instance, the display 122 may be implemented by a liquid crystal display (LCD) such as a touch-sensitive, color, thin-film transistor (TFT) LCD, a plasma display, a light emitting diode (LED) display, an organic light emitting diode (OLED) display, a cathode ray tube (CRT) display, or other type of suitable visual interface for displaying information or graphics on a user interface 124 to a user of the one or more clients 120-*b*.

In various embodiments, the servers 110-*a* may comprise one or more transceivers 160-*g*. Each of the transceivers 160-*g* may be implemented as wired transceivers, wireless transceivers, or a combination of both. In some embodiments, the transceivers 160-*g* may be implemented as physical wireless adapters or virtual wireless adapters, sometimes referred to as "hardware radios" and "software radios." In the latter case, a single physical wireless adapter may be virtualized using software into multiple virtual wireless adapters. A physical wireless adapter typically connects to a hardware-based wireless access point. A virtual wireless adapter typically connects to a software-based wireless access point, sometimes referred to as a "SoftAP." For instance, a virtual wireless adapter may allow ad hoc communications between peer devices, such as a smart phone and a desktop computer or notebook computer. Various embodiments may use a single physical wireless adapter implemented as multiple virtual wireless adapters, multiple physical wireless adapters, multiple physical wireless adapters each implemented as multiple virtual wireless adapters, or some combination thereof. The embodiments are not limited in this case.

The wireless transceivers 160-g may comprise or implement various communication techniques to allow the servers 110-a to communicate with other electronic devices, such as clients 120-b and computing devices hosting data sources 130-h. For instance, the wireless transceivers 160-g may implement various types of standard communication elements designed to be interoperable with a network, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

In various embodiments, the servers 110-a may implement different types of transceivers 160-g. Each of the transceivers 160-g may implement or utilize a same or different set of communication parameters to communicate information between various electronic devices. In one embodiment, for example, each of the transceivers 160-g may implement or utilize a different set of communication parameters to communicate information between the servers 110-a and one or more remote devices, such as remote clients 120-b and data sources 130-h. Some examples of communication parameters may include without limitation a communication protocol, a communication standard, a radio-frequency (RF) band, a radio, a transmitter/receiver (transceiver), a radio processor, a baseband processor, a network scanning threshold parameter, a radio-frequency channel parameter, an access point parameter, a rate selection parameter, a frame size parameter, an aggregation size parameter, a packet retry limit parameter, a protocol parameter, a radio parameter, modulation and coding scheme (MCS), acknowledgement parameter, media access control (MAC) layer parameter, physical (PHY) layer parameter, and any other communication parameters affecting operations for the transceivers 160-g. The embodiments are not limited in this context.

In one embodiment, for example, the transceiver 160-g may comprise a radio designed to communicate information over a wireless local area network (WLAN), a wireless metropolitan area network (WMAN), a wireless wide area network (WWAN), or a cellular radiotelephone system. The transceiver 160-g may be arranged to provide data communications functionality in accordance with different types of longer range wireless network systems or protocols. Examples of suitable wireless network systems offering longer range data communication services may include the IEEE 802.xx series of protocols, such as the IEEE 802.11a/b/g/n series of standard protocols and variants, the IEEE 802.16 series of standard protocols and variants, the IEEE 802.20 series of standard protocols and variants (also referred to as "Mobile Broadband Wireless Access"), and so forth. Alternatively, the transceiver 160-g may comprise a radio designed to communication information across data networking links provided by one or more cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and similar systems. It may be appreciated that other wireless techniques may be implemented, and the embodiments are not limited in this context.

Although not shown, the servers 110-a and clients 120-b may further comprise one or more device resources commonly implemented for electronic devices, such as various computing and communications platform hardware and software components typically implemented by a personal electronic device. Some examples of device resources may include without limitation a co-processor, a graphics processing unit (GPU), a chipset/platform control hub (PCH), an input/output (I/O) device, computer-readable media, display electronics, display backlight, network interfaces, location devices (e.g., a GPS receiver), sensors (e.g., biometric, thermal, environmental, proximity, accelerometers, barometric, pressure, etc.), portable power supplies (e.g., a battery), application programs, system programs, and so forth. Other examples of device resources are described with reference to exemplary computing architectures shown by FIGS. 7 and 8. The embodiments, however, are not limited to these examples.

In the illustrated embodiment shown in FIG. 1, the processor circuit 140 may be communicatively coupled to the transceiver 160-g and the memory unit 150. The memory unit 150 may store a development center testing application 170 arranged for execution by the processor circuit 140 to test an application 180-c. The clients 120-b may implement similar elements as the servers 110-a, including a processor circuit 140, a memory unit 150, and transceivers 160-g.

Clients 120-b may be comprised of a memory unit 150 storing an application 180-c comprising application code 182-d. A user may access an application 180-c stored in the memory unit 150 or may upload an application 180-c to the server 110-a through one or more communication signals 112 received at the transceivers 160-g. According to embodiments, applications 180-c may be a software application in various forms or stages of development. The client 120-b may additionally comprise a display 122, for example, for accessing a user interface 124 for interacting with the development center testing application 170. According to embodiments, the server 110-a may present a user interface 124 providing results of testing an application 180-c accessible from the client 120-b.

The development environment 134-f may generally comprise an environment, such as a software development environment, for developing applications 180-c. According to embodiments, the development environment 134-f may be associated with certain software libraries, tools, such as a compiler and editor, and application programming interfaces (APIs) for supporting an application 180-c developed utilizing one or more software programming languages or constructs, including, without limitation, the extensible markup language (XML), Java®, and JavaScript® Object Notation (JSON). Embodiments provide that the development environment 134-f may provide support for at least applications capable of operating within the application development center system 100. An application 180-c may be a fully functioning software program, or programming code, segments, snippets, functions, libraries, wrappers, APIs, or combinations thereof. In one embodiment, an application 180-c may comprise a function developed to interact with a particular API or program already accessible through the application development center system 100. The application code 182-*d* may comprise programming code developed in one or more programming languages for execution on a processor circuit 140.

In one embodiment, a client 120-*b* may access the development center testing application 170 operating on a server 110-*a*, and any test data 132-*e* associated therewith, utilizing a web browser application executing on the client 120-*b* including without limitation Microsoft® Internet Explorer®, Mozilla® Firefox®, Apple® Safari®, and Google Chrome™ browser applications. In another embodiment, a client 120-*b* may access the development center testing application 170 operating on a server 110-*a* utilizing a thin-client application and any associated thin-client hardware accessible by the client 120-*b*, including, but not limited to, ultra-thin client, web thin client, and mobile thin client implementations.

Particular aspects, embodiments and alternatives of the application development center system 100 and the development center testing application 170 may be further described with reference to FIG. 2.

Figure 2:
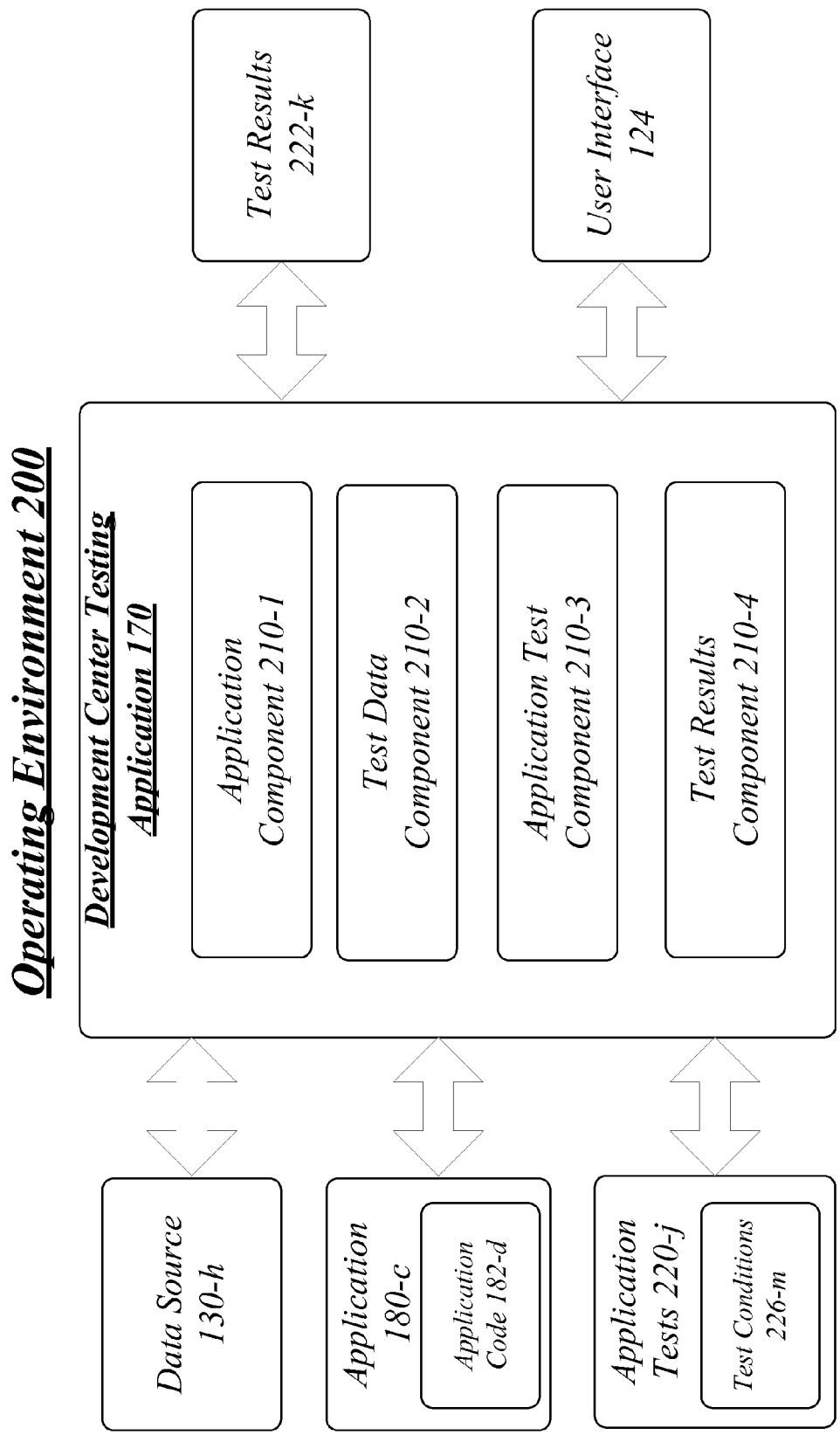
FIG. 2 illustrates an embodiment of a first operating environment for a development center testing application.

FIG. 2 illustrates an embodiment of an operating environment 200 for the application development center system 100. More particularly, the operating environment 200 may illustrate a more detailed block diagram for the development center testing application 170.

As shown in FIG. 2, the development center testing application 170 may comprise various components 210-*i*. As used in this application, the term "component" is intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In the illustrated embodiment shown in FIG. 2, the development center testing application 170 may comprise an application component 210-1, a test data component 210-2, an application test component 210-3, and a test results component 210-4. Although the development center testing application 170 shown in FIG. 2 has only four components in a certain topology, it may be appreciated that the development center testing application 170 may include more or less components in alternate topologies as desired for a given implementation. The embodiments are not limited in this context.

The application component 210-1 may generally operate to manage applications 180-*c* for the application development center system 100. For example, the application component 210-1 may receive applications 180-*c*, in various forms of development, uploaded to the server 110-*a* from a client 120-*b*. In another example, the application component 210-1 may facilitate the development of applications 180-*c*, either originated at the server 110-*a* or the client 120-*b*, within the development environment 134-*f*. The application component 210-1 may operate to provide programming libraries, software development kits, and tools, such as compilers, editors, debuggers, revision managers, and the like for facilitating the development of applications within the application development center system 100. In one embodiment, users may register with the application development center system 100, creating user accounts associated with user profiles. The application component 210-1 may associate one or more applications 180-*c* with the one or more users for efficient access of applications 180-*c*.

The test data component 210-2 may generally operate to provide test data for testing the applications 180-*c*. For example, the test data component 210-2 may access one or more data sources 130-*h* for data to be used during testing and/or development. According to embodiments, the data sources 130-*h* may comprise data relevant to and capable of testing applications 180-*c*. For example, if an application 180-*c* is dedicated to the financial services industry, a relevant data source 130-*h* may be comprised of financial information for the particular application 180-*c*, such as commodity price data over a certain time period for an application 180-*c* focused on analyzing commodity prices for certain commodity trading entities. In another example, if an application 180-*c* is focused on a fantasy sports league, such as a baseball fantasy sports league, the data source 130-*h* may comprise data including MLB® statistics or statistics from other fantasy baseball leagues.

Unnecessary resource utilization may occur if the server 110-*a* had to obtain data directly from a data source 130-*h* or had to operate on a complete data set for each application test 220-*j*. As such, embodiments provide that the test data component 210-2 may be configured to obtain subsets of data from one or more data sources 130-*h*, such as, only the data necessary to produce a realistic, rigorous application test 220-*j* for an application 180-*c*. For example, a data source 130-*h* comprising NFL® statistics may be relevant to an application test 220-*j* for a fantasy football application 180-*c*. However, the test data 132-*e* may only comprise offensive statistics for a certain time period. For example, certain data occurring before a rule change may not be as useful as data occurring after the rule change, or one or more years with uncommon statistics may be excluded (such as a year with an uncommon average number of passing yards) to achieve better accuracy. According to embodiments, data sources 132-*h*, and therefore test data 132-*e*, may comprise any data useful to the application, regardless of its source or whether the data is historical or simulated. Embodiments are not limited in this context.

The application test component 210-3 may generally operate to perform application tests 220-*j* on the applications 180-*c*. According to embodiments, the application tests 220-*j* may involve execution of the applications 180-*c* within the development environment 134-*f* utilizing the test data 132-*e* and one or more test conditions 226-*m*. In one embodiment, the application tests 220-*j* may involve populating data elements within the application with test data 132-*e*. In another embodiment, application tests 220-*j* may involve the actual execution of the applications 180-*c* on the server 110-*a*, such as in real-time or in a step-wise manner. The application test component 210-3 may generally perform error handling of the application 180-*c* in accordance with the underlying development environment 134-*f*. For example, if the application code 182-*d* being tested comprises JavaScript®, then the error handling may be supported through standard JavaScript® error handling libraries and functions.

Embodiments provide for test conditions 226-*m* for performing one or more different application tests 220-*j* on the applications 180-*c*. For example, a test condition 226-*m* may specify which data source 130-*h* to use or which data from the data source 130-*h* (e.g., specified time period, accuracy, value range, etc.). In another example, a test condition 226-*m* may specify which portions of the application 180-*c* to test. For instance, a developer may demarcate certain segments of the application code 182-*d* for testing and other segments to be ignored during an application test 220-*j* (e.g., previously verified code, working code, or code still in development). According to embodiments, the test conditions 226-*m* may be configured to provide any type of circumstances for operating a test capable of being handled by the development center testing application 170. Embodiments are not limited in this context.

The test results component 210-4 may generally operate to provide and manage test results 222-*k* from the application tests 220-*j*. For example, the test results component 210-4 may operate to present test results 222-*k* on a user interface 124 accessible via a display 122 coupled to the client 120-*b*. The test results component 210-4 may receive test results 222-*k* during an active application test 220-*j* and may continually or periodically update the user interface 124 as the application test 220-*j* proceeds. The status of an application test 220-*j* may similarly be presented by the test results component 210-4 on the user interface 124. An exemplary status of an application test 220-*j* may include application name, application revision, test progress, such as, in progress, halted, test failure or success, application code location (e.g., line or file information), type of test, data sources, or combinations thereof.

Figure 3:
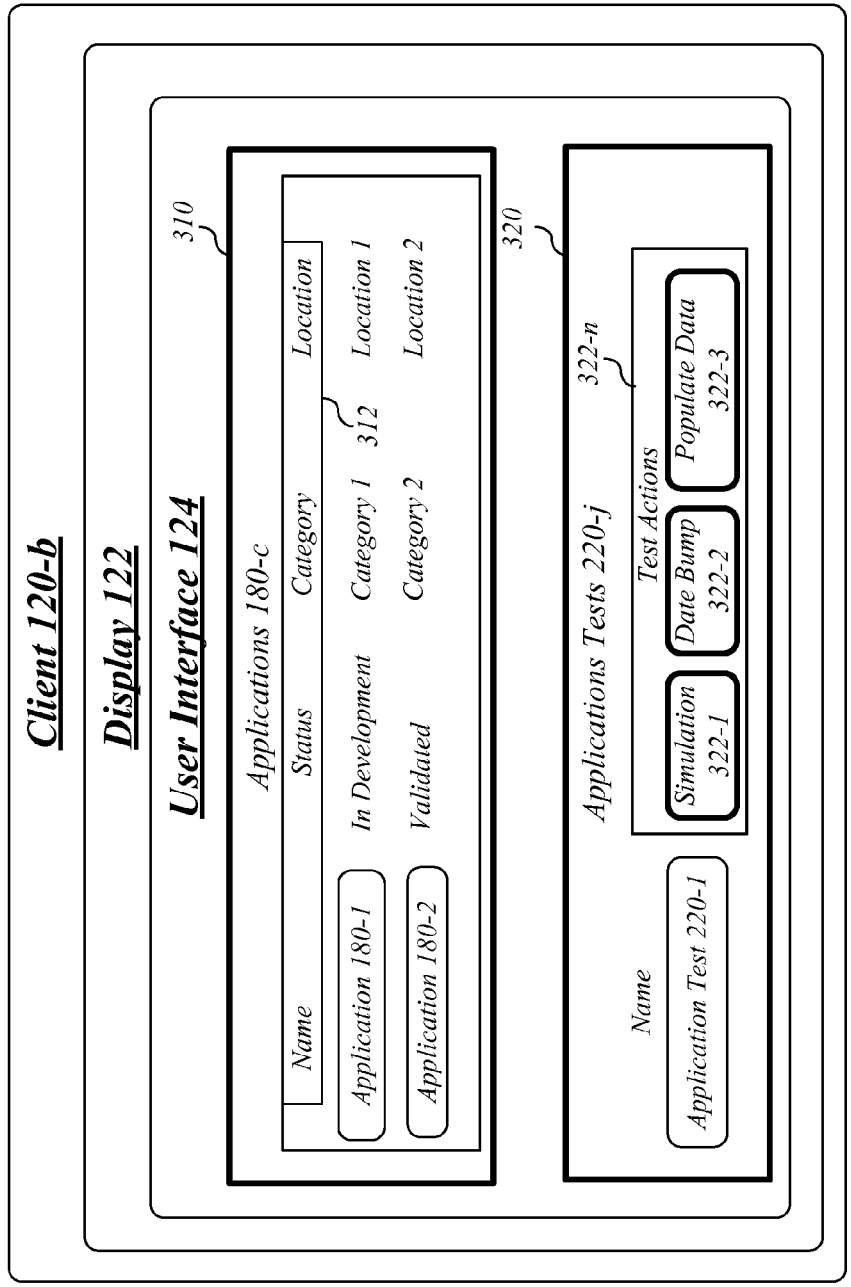
FIG. 3 illustrates an embodiment of a second operating environment for a development center testing application.

FIG. 3 illustrates an embodiment of an operating environment 300 for the application development center system 100. More particularly, the operating environment 300 may illustrate a user interface 124 for testing applications 180-*c* according to embodiments described herein.

In the illustrated embodiment shown in FIG. 3, the user interface 124 may be presented to a user via a display 122 coupled to a client 120-*b*. For example, the user interface 124 may comprise an application interface for an application associated with the application development center system 100, such as a mobile app configured for a mobile computing device. In another example, the user interface 124 may comprise a website associated with the application development center system 100. In the example embodiment depicted in FIG. 1, the user interface 124 may comprise an application graphical user interface (GUI) element 310 configured to present available applications 180-1, 180-2 to a user. The applications 180-1, 180-2 may be associated with one or more application elements 312, such as an application name, status, category, or location. For example, the status may define where the application 180-1, 180-2 is in the development life cycle, the category may define a focus of the application 180-1, 180-2 (e.g., fantasy baseball, fantasy football, stock trading, document management, etc.), and the location may define a specific area within the category (e.g., statistics or draft for fantasy sports related applications).

In many cases, test conditions 226-*m* may be configured to provide any type of circumstances for operating a test capable of being handled by the development center testing application 170. The development center testing application 170 may retrieve different sets of test conditions 226-*m* specifically designed to test an application 180-*c* under any conceivable circumstances to accurately simulate a multitude of conditions experienced by users during actual deployment of the application 180-*c*. In this manner, application developers may use the development center testing application 170 to automatically test an application 180-*c* under a variety of scenarios or test conditions as provided by the application development center system 100.

In some cases, rather than the development center testing application 170 of the application development center system 100 automatically performing application tests 220-*j*, some testing operations may be performed by actual users. As show in FIG. 2, a user interface 124 may comprise a test GUI element 320 configured to present one or more application tests 220-1 to one or more users under real or simulated conditions. This allows a potentially greater range of testing conditions to be tested in accordance with human ingenuity and creativity, which may not have been captured yet by an application test 220-*j* or set of test conditions 226-*m*.

In other cases, some combination of automatic and manual testing operations may be performed to fully test the limits of a given application 180-*c*. The embodiments are not limited in this context.

It may be appreciated that a given application test 220-*j* may be executed for a specific application 180-*c* or may be generalized for more than one application 180-*c*. For example, an application test 220-*j* may be configured to test database connections, which may be generalized for use with any application 180-*c* having database connections.

The application tests 220-*j* may be configured to operate according to one or more test actions 322-*n*. According to embodiments, the test actions 322-*n* may be configured to test certain aspects of an application, to perform certain tests, or to test utilizing certain test data 132-*e*. For example, a simulation 322-1 test action may operate to fully simulate an application 180-*c*, a date bump 322-2 test action may operate to change the date range of the test data 132-*e*, and a populate data 322-3 test action may operate to populate any data fields, elements, etc., with test data 132-*e*, but not actually execute the application 180-*c*. The example test actions 322-1, 322-2, 322-3 depicted in FIG. 3 are illustrative and non-restrictive, as any test action capable of operating with the development center testing application 170 is contemplated herein. Embodiments are not so limited. From the user interface 124 depicted in FIG. 3, a user may access an application 180-1, 180-2, for example, and continue developing the application in a development environment 134-*f*. The user may additionally create and run application tests 220-1 directed toward the one or more applications 180-1, 180-2.

Figure 4:
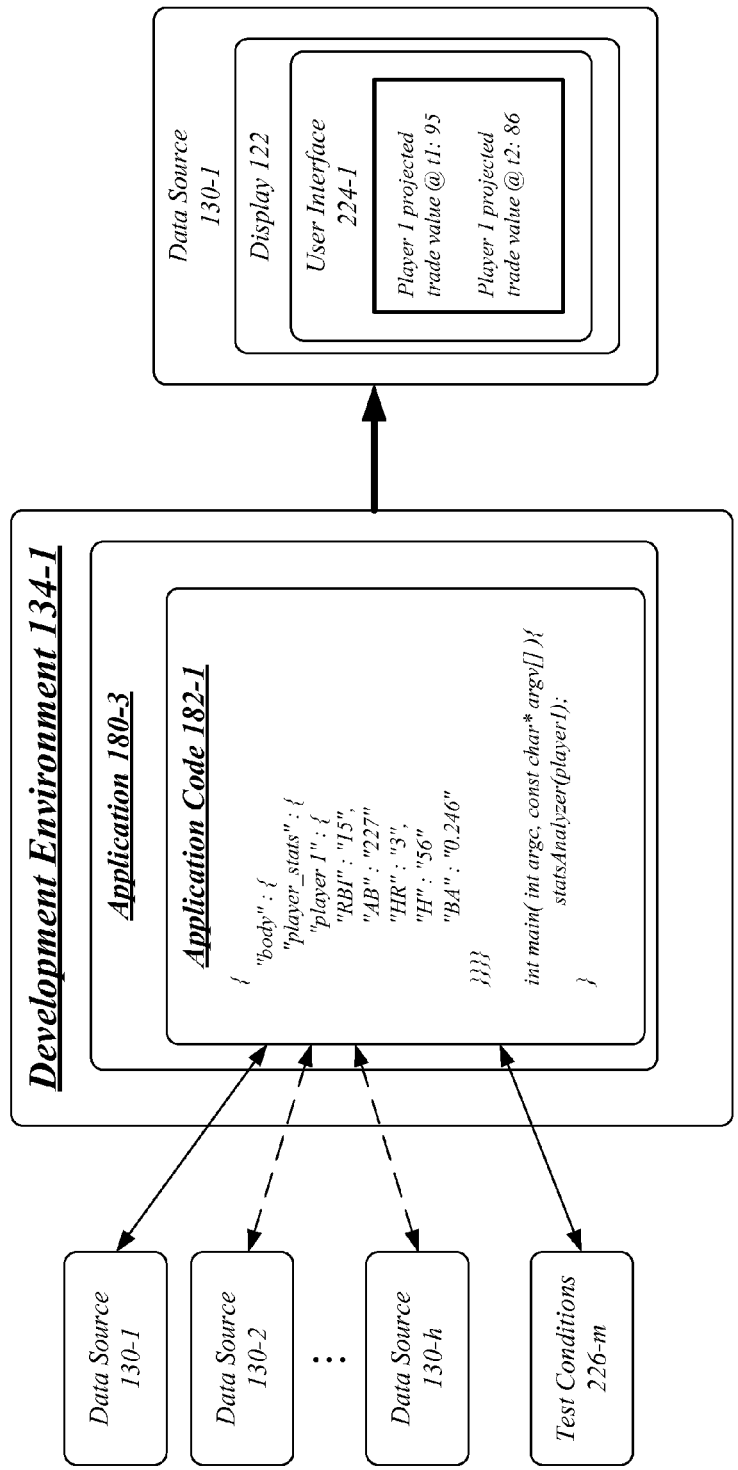
FIG. 4 illustrates an embodiment of a third operating environment for a development center testing application.

FIG. 4 illustrates an embodiment of an operating environment 400 for the application development center system 100. More particularly, the operating environment 400 may illustrate an application test 220-*j* of an application 180-*c*. FIG. 4 illustrates an application 180-3 within a development environment 134-1. According to embodiments, a user may run application tests 220-*j* while developing an application 180-3, for example, through one or more GUI elements (not shown) operative to initiate an application test 220-*j*, such as those depicted in FIG. 3. Responsive to initiation of an application test 220-*j*, the test data component 210-2 may access data sources 130-1, 130-2, 130-*h* for the application test. However, based on the test conditions 226-*m*, not all of the data sources may be utilized (as indicated by the broken lines to data source 130-2, 130-*h*). In the application test 220-*j* depicted in FIG. 4, only data from data source 130-1 is being utilized as test data 132-*e*.

The application test component 210-3 may perform the application test 220-*j* according to the test conditions 226-*m*. The results may be handled by the test results component 210-4. In the example embodiment of FIG. 4, the test results 222-*k* are presented on a user interface 124 from a display 122 coupled to the client 120-*b*. For instance, the application 180-3 may attempt to predict the trade value of baseball players within a particular baseball fantasy league. The application code 182-1 may comprise code configured to obtain statistics for the players and to analyze them according to one or more processes. The test conditions 226-*m* may be set to test using test data 132-*e* at certain points in the baseball season. The test results 222-1 may display projected trade values for a player at different points in the baseball season. For example, certain players may become more valuable as the season progresses, while statistics for other players may drop off after a certain number of games. Testing utilizing test data 132-*e* from certain time periods allows applications 180-*c*, such as application 180-3, to test the application code 182-1 in a more accurate and effective manner.

The example embodiment of FIG. 4 is illustrative and non-restrictive and is intended to provide one example implementation of an application test 220-*j*. In addition, although sports and fantasy sports in particular have been utilized for constructing examples herein, embodiments are not so limited. In addition, the fantasy sports applications are not limited to baseball or football, as any sport, at the professional, collegiate, or amateur level, capable of arrangement in a fantasy sports application is contemplated in this detailed description. Furthermore, any application 180-*c* and data source 130-*h* capable of operating according to embodiments is contemplated herein. Additional exemplary application categories include financials, legal, document management, demographics, and engineering. Embodiments are not limited in this context.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 5 illustrates one embodiment of a logic flow 500. The logic flow 500 may be representative of some or all of the operations executed by one or more embodiments described herein. For example, the logic flow 500 may illustrate operations performed by the application development center system 100.

In the illustrated embodiment shown in FIG. 5, the logic flow 500 may receive an application at a server computing device at block 502. For example, a user may upload or develop an application 180-*c* at the server 110-*a* managed through the application component 210-1 of the development center testing application 170.

The logic flow 500 may access test data from one or more data sources at block 504. For example, the test data component 210-2 may access one or more data sources 130-*h* as a resource for obtaining test data 132-*e*. The test data 132-*e* may be any data capable of being used by an application 180-*c*, for example, for testing purposes. According to certain embodiments, the test data 132-*e* may be configured to accurately simulate real-world data relevant to the application 180-*c*. For example, if an application 180-*c* is configured as a fantasy baseball application, the test data 132-*e* may be comprised of baseball statistics from a MLB® statistics data source 132-*h*.

The logic flow 500 may test the application within a development environment resident on the server computing device utilizing the test data at block 506. For example, the application test component 210-3 may operate to test an application 180-*c* utilizing test data 132-*e* obtained by the test data component 210-2. Testing the application may comprise performing one or more test actions 322-*n*, such as populating application data fields, simulating application execution in a real-time or step-wise manner, changing data sets, including changing the date range of the data.

The logic flow 500 may present test results on a user interface accessible by a client computing device at block 506. For example, the test results component 210-4 may present test results 222-*k* on a user interface 124 accessible from a client 120-*b*, such as through a display 122 coupled to the client 120-*b*. The test results component 210-4 may access test results 222-*k* as produced during application tests 220-*j* carried out through the application test component 210-3. In this manner, a user may visually see how an application 180-*c* may operate using test data 132-*e* within the development environment 134-*f*, which may mimic the actual operating environment for the released application 180-*c* (e.g., a website hosting the online application).

Figure 6:
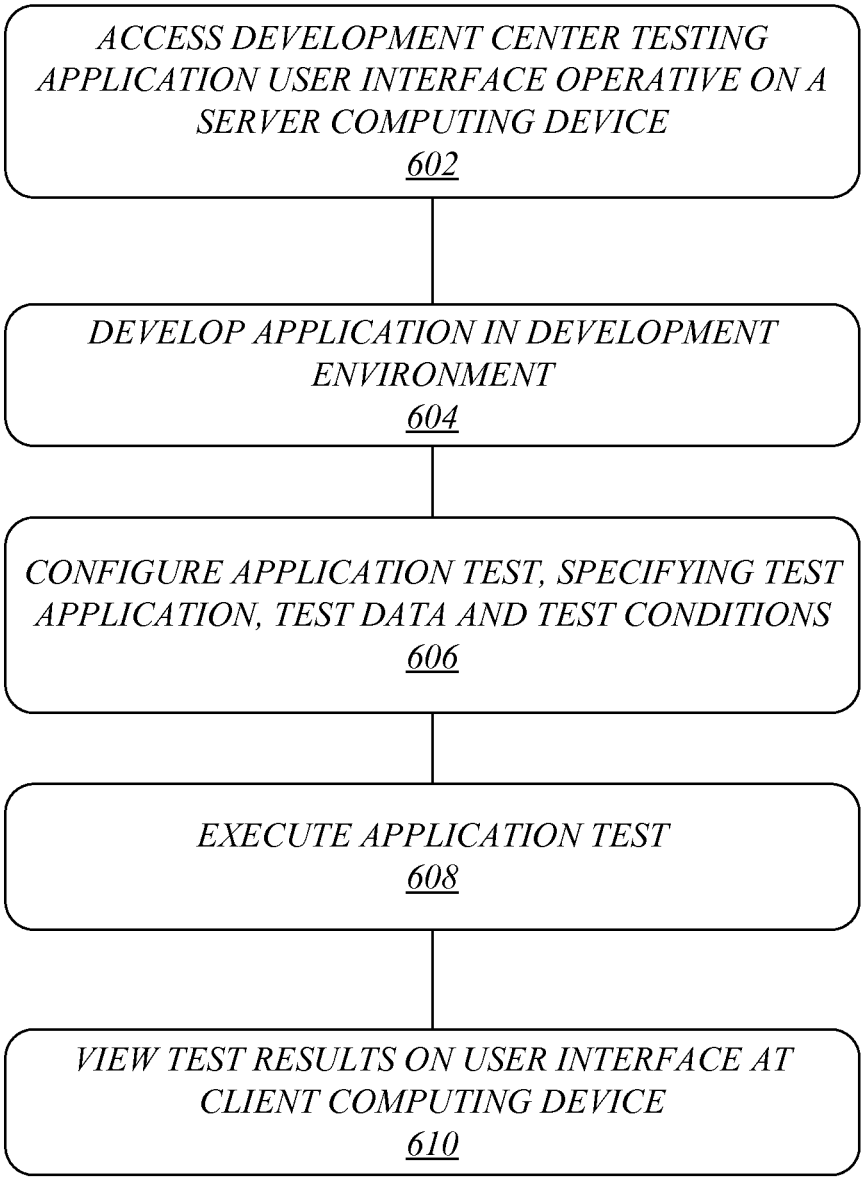
FIG. 6 illustrates a second logic flow in accordance with one or more embodiments.

FIG. 6 illustrates one embodiment of a logic flow 600. The logic flow 600 may be representative of some or all of the operations executed by one or more embodiments described herein. For example, the logic flow 600 may illustrate operations performed by the application development center system 100.

In the illustrated embodiment shown in FIG. 6, the logic flow 600 may access a development center testing application user interface operative on a server computing device at block 602. For example, a user may access a user interface 124 for the development center testing application 170 operating on the server 110-*a*. The user interface 124 may comprise an application graphical user interface (GUI) element 310 configured to present available applications 180-1, 180-2 to a user.

The logic flow 600 may develop an application in a development environment at block 604. For example, a user may develop an application 180-*c* within a development environment 1341 supported by the application development center system 100. The development environment 134-*f* may be configured to support one or more programming languages, APIs, libraries, or other programming components associated with the application 180-*c*. In one embodiment, the application 180-*c* may be configured to operate on a platform associated with the application development center system 100. For example, an online fantasy sports platform may be associated with the application development center system 100 such that applications 180-*c* developed within the application development center system 100 may be ported to the fantasy sports platform.

The logic flow 600 may configure an application test, specifying test application, test data and test conditions at block 606. For example, a user may configure an application test 220-*j* utilizing a test GUI element 320 configured to present one or more application tests 220-1 to a user. Embodiments provide that the user may specify one or more test conditions 226-m and one more test actions 322-n for each application test 220-j.

The logic flow 600 may execute application test at block 608. For example, a user may execute an application test 220-j associated with an application 180-c. In one embodiment, the application test component 210-3 may manage the operation of the application test 220-j.

The logic flow 600 may view test results on user interface at client computing device at block 610. For example, the test results component 210-4 may present test results 222-k generated during the application test 220-j on a user interface 124 accessible from a display 122 coupled to a client 120-b.

Figure 7:
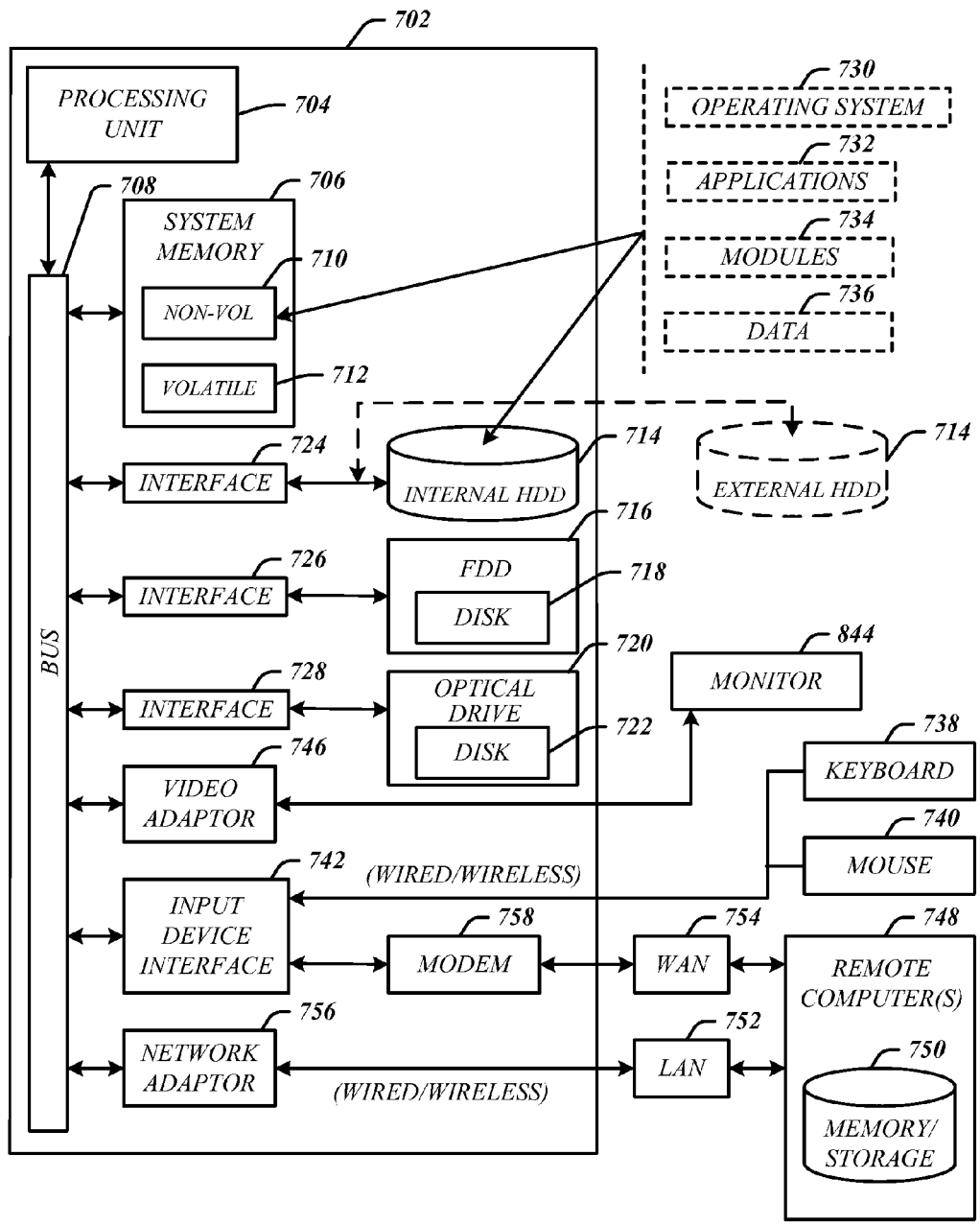
FIG. 7 illustrates a computing architecture in accordance with one or more embodiments.

FIG. 7 illustrates an embodiment of an exemplary computing architecture 700 suitable for implementing various embodiments as previously described. In one embodiment, the computing architecture 700 may comprise or be implemented as part of servers 110-a or clients 120-b.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, such as those described with reference to the processor circuit 140 shown in FIG. 1.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, and so forth. The embodiments, however, are not limited to implementation by the communications architecture 900.

Figure 8:
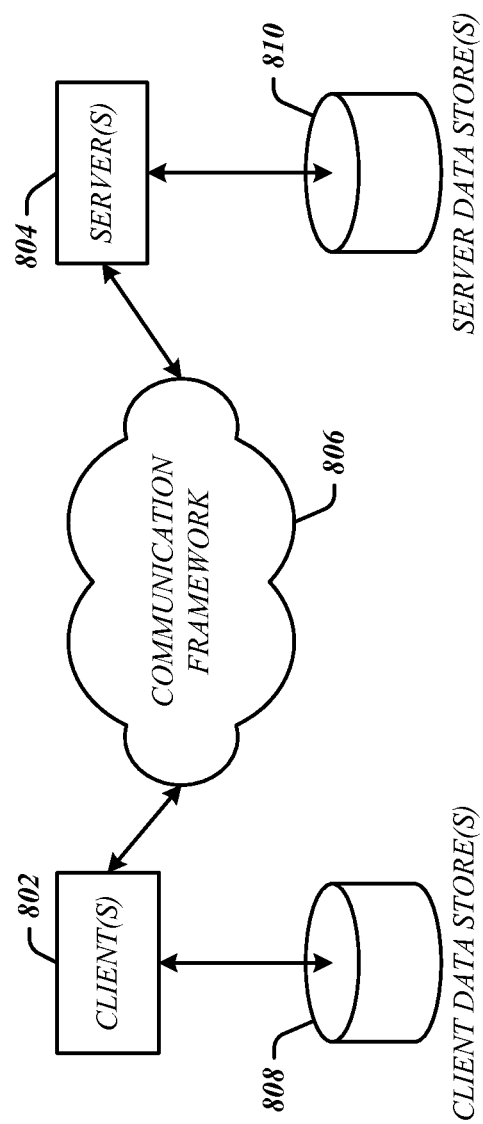
FIG. 8 illustrates an embodiment of a communications architecture.

As shown in FIG. 8, the communications architecture 800 comprises includes one or more clients 802 and servers 804. The clients 802 may implement the client device 120-*b*. The servers 804 may implement summary engine device 110, and publication site 140. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 802 and the servers 804 may include various types of standard communication elements designed to be interoperable with the communications framework 806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 802 and a server 804 can be in the form of a data packet adapted to be transmitted between two or more computer processes. The data packet may include a cookie and/or associated contextual information, for example.

The various elements of the application development center system 100 as previously described with reference to FIGS. 1-8 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method comprising:
   receiving an application at a server computing device from a client computing device;
   accessing, by the server computing device, test data from one or more data sources, wherein the one or more data sources are separate from the application and from the client computing device;
   testing the application within a development environment resident on the server computing device according to a plurality of sets of test conditions and utilizing the test data, wherein utilizing the test data comprises at least one of: populating a data field in the application with a test data value or changing a test data value, and wherein each of the plurality of sets of test conditions is designed to test an application under a different circumstance to simulate a plurality of conditions experienced by users during actual deployment of the application and comprises at least one of: a specification of which of the one or more data sources to use or a specification of a portion of the application to test; and
   presenting test results on a user interface accessible by a client computing device.

2. The computer-implemented method of claim 1, the test data comprising a sub-set of data contained in the one or more data sources.

3. The computer-implemented method of claim 1, wherein testing the application comprises executing the application utilizing test data from a specified time period.

4. The computer-implemented method of claim 1, the application comprising application code developed in the development environment.

5. The computer-implemented method of claim 1, the application comprising a fantasy sports application.

6. The computer-implemented method of claim 5, the fantasy sports application comprising at least one of a fantasy baseball application and a fantasy football application.

7. The computer-implemented method of claim 6, the one or more data sources comprising at least one of a baseball league statistics data source and a football league statistics data source.

8. An apparatus, comprising:
   a transceiver;
   a processor circuit coupled to the transceiver; and
   a memory unit coupled to the processor circuit, the memory unit to store a development center testing application operative on the processor circuit to test an application, the development center testing application comprising:
   an application component operative to receive an application from a client computing device;
   a test data component operative to access test data from one or more data sources via the transceiver, wherein the one or more data sources are separate from the application and from the client computing device;
   an application test component operative to test the application within a development environment according to a plurality of sets of test conditions and utilizing the test data, wherein utilizing the test data comprises at least one of: populating a data field in the application with a test data value or changing a test data value, and wherein each of the plurality of sets of test conditions is designed to test an application under a different circumstance to simulate a plurality of conditions experienced by users during actual deployment of the application and comprises at least one of: a specification of which of the one or more data sources to use or a specification of a portion of the application to test; and a test results component operative to present test results on a user interface accessible by a client computing device.

9. The apparatus of claim 8, the test data comprising a sub-set of data contained in the one or more data sources.

10. The apparatus of claim 8, the application test component operative to test the application via executing the application utilizing test data from a specified time period.

11. The apparatus of claim 8, the application comprising application code developed in the development environment.

12. The apparatus of claim 8, the application comprising a fantasy sports application.

13. The apparatus of claim 12, the fantasy sports application comprising at least one of a fantasy baseball application and a fantasy football application.

14. The apparatus of claim 13, the one or more data sources comprising at least one of a baseball league statistics data source and a football league statistics data source.

15. At least one non-transitory computer-readable storage medium comprising instructions that, when executed, cause a system to:

receive an application from a client computing device;

access test data from one or more data sources, wherein the one or more data sources are separate from the application and from the client computing device;

test the application within a development environment according to a plurality of sets of test conditions and utilizing the test data, wherein utilizing the test data comprises at least one of: populating a data field in the application with a test data value or changing a test data value, and wherein each of the plurality of sets of test conditions is designed to test an application under a different circumstance to simulate a plurality of conditions experienced by users during actual deployment of the application and comprises at least one of: a specification of which of the one or more data sources to use or a specification of a portion of the application to test; and present test results on a user interface accessible by a client computing device.

16. The computer-readable storage medium of claim 15, the test data comprising a sub-set of data contained in the one or more data sources.

17. The computer-readable storage medium of claim 15, comprising instructions that, when executed, cause the system to test the application via executing the application utilizing test data from a specified time period.

18. The computer-readable storage medium of claim 15, the application comprising application code developed in the development environment.

19. The computer-readable storage medium of claim 15, the application comprising a fantasy sports application.

20. The computer-readable storage medium of claim 19, the fantasy sports application comprising at least one of a fantasy baseball application and a fantasy football application.

21. The computer-readable storage medium of claim 20, the one or more data sources comprising at least one of a baseball league statistics data source and a football league statistics data source.

22. A computer-implemented method comprising:

presenting an application within a development environment resident on a server computing device, the application received from a client computing device;

generating an application test to test the application, the application test comprising test data and a plurality of sets of test conditions, wherein the test data is obtained from one or more data sources separate from the application and separate from the client computing device and wherein each of the plurality of sets of test conditions is designed to test an application under a different circumstance to simulate a plurality of conditions experienced by users during actual deployment of the application and comprises at least one of: a specification of which of the one or more data sources to use or a specification of a portion of the application to test;

running the application test according to one a plurality of sets of test conditions and utilizing the test data, wherein utilizing the test data comprises at least one of: populating a data field in the application with a test data value or changing a test data value; and accessing test results presented on a user interface accessible by a client computing device.

23. The computer-implemented method of claim 22, the test data comprising a sub-set of data contained in one or more data sources accessible by the server computing device.

24. The computer-implemented method of claim 22, wherein testing the application comprises executing the application utilizing test data from a specified time period.

* * * * *

UNITED STATES PATENT AND TRADEMARK OFFICE
CERTIFICATE OF CORRECTION

| | | |
|---|---|---|
| PATENT NO. | : 9,454,464 B2 | Page 1 of 1 |
| APPLICATION NO. | : 13/569902 | |
| DATED | : September 27, 2016 | |
| INVENTOR(S) | : Antonio L. Fernandez et al. | |

It is certified that error appears in the above-identified patent and that said Letters Patent is hereby corrected as shown below:

In the Specification

Column 14, Line 52, replace "1341" with -- 134-f --

Signed and Sealed this
Twenty-seventh Day of December, 2016

Michelle K. Lee
*Director of the United States Patent and Trademark Office*